4 Sheets—Sheet 2.

C. KIMPLEN.
MACHINE FOR COMPRESSING TAN-BARK, &c.,

No. 195,377. Patented Sept. 18, 1877.

Witnesses: Inventor:

C. KIMPLEN.
MACHINE FOR COMPRESSING TAN-BARK, &c.,

No. 195,377. Patented Sept. 18, 1877.

Witnesses: Inventor:
Cornelius Kimplen

4 Sheets—Sheet 4.

C. KIMPLEN.
MACHINE FOR COMPRESSING TAN-BARK, &c.,

No. 195,377. Patented Sept. 18, 1877.

Witnesses:

Inventor:
Cornelius Kimplen

UNITED STATES PATENT OFFICE.

CORNELIUS KIMPLEN, OF CHICAGO, ILLINOIS, ASSIGNOR OF ONE-HALF HIS RIGHT TO WILLIAM R. GOULD, OF SAME PLACE.

IMPROVEMENT IN MACHINES FOR COMPRESSING TAN-BARK, &c.

Specification forming part of Letters Patent No. 195,377, dated September 18, 1877; application filed April 19, 1877.

*To all whom it may concern:*

Be it known that I, CORNELIUS KIMPLEN, of the city of Chicago, Cook county, State of Illinois, have invented new and useful Improvements in Machine for Compressing Tan-Bark and other substances, of which the following is a full description, reference being had to the accompanying drawings, consisting of four sheets, in which—

Figure 1:
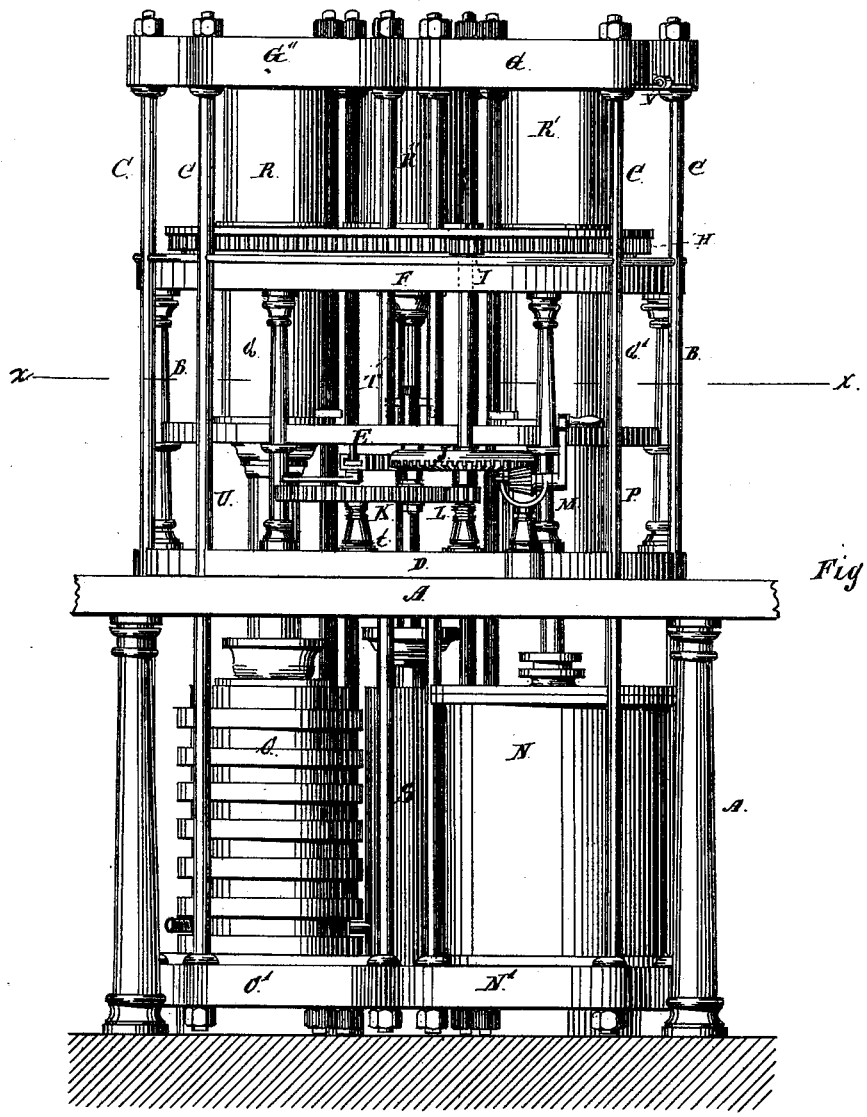
Figure 2:
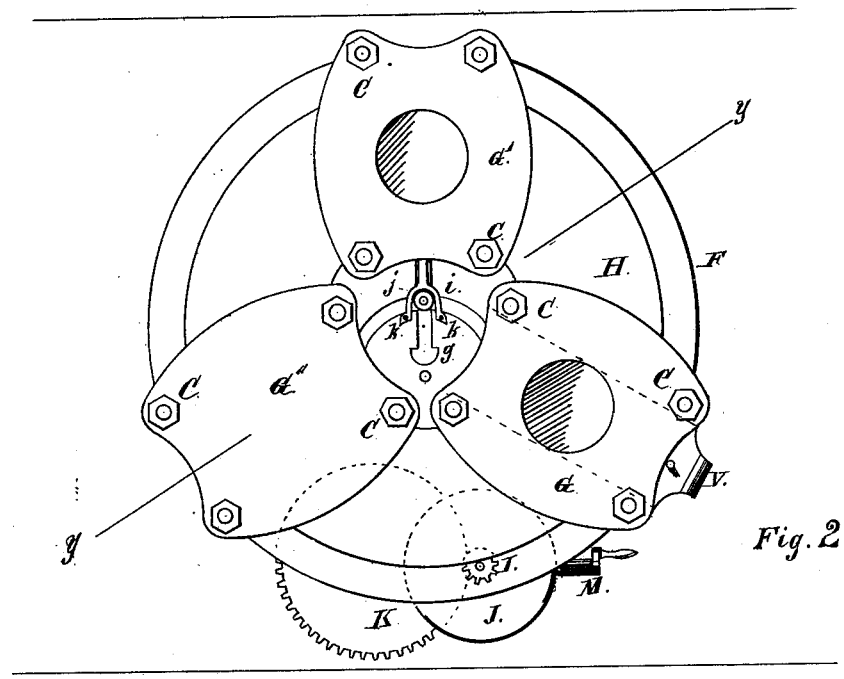
Figure 3:
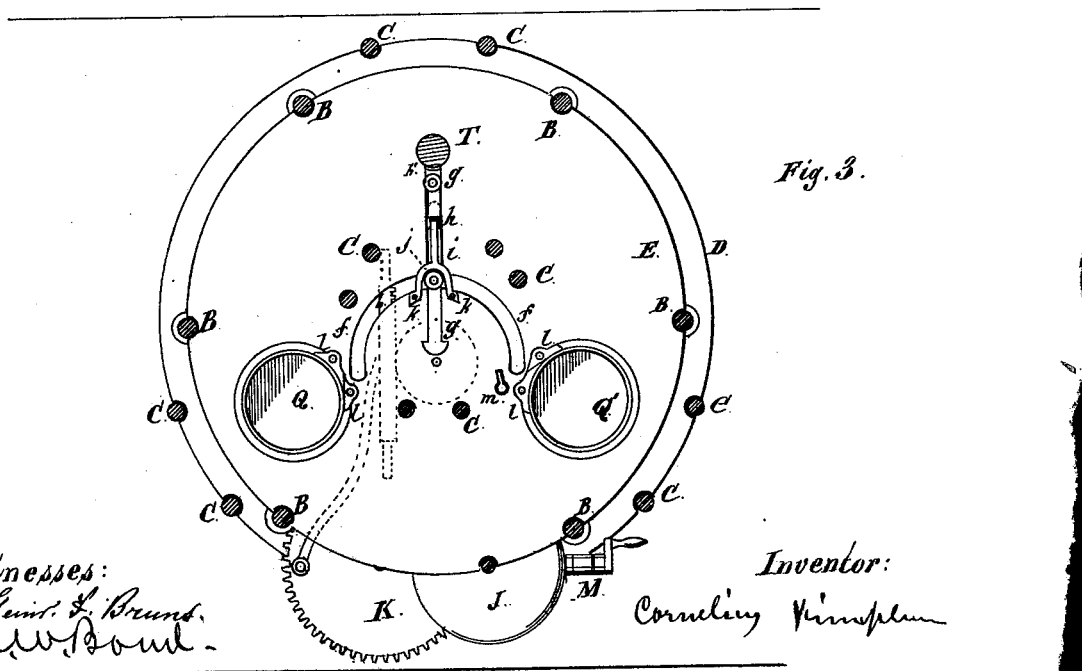
Figure 4:
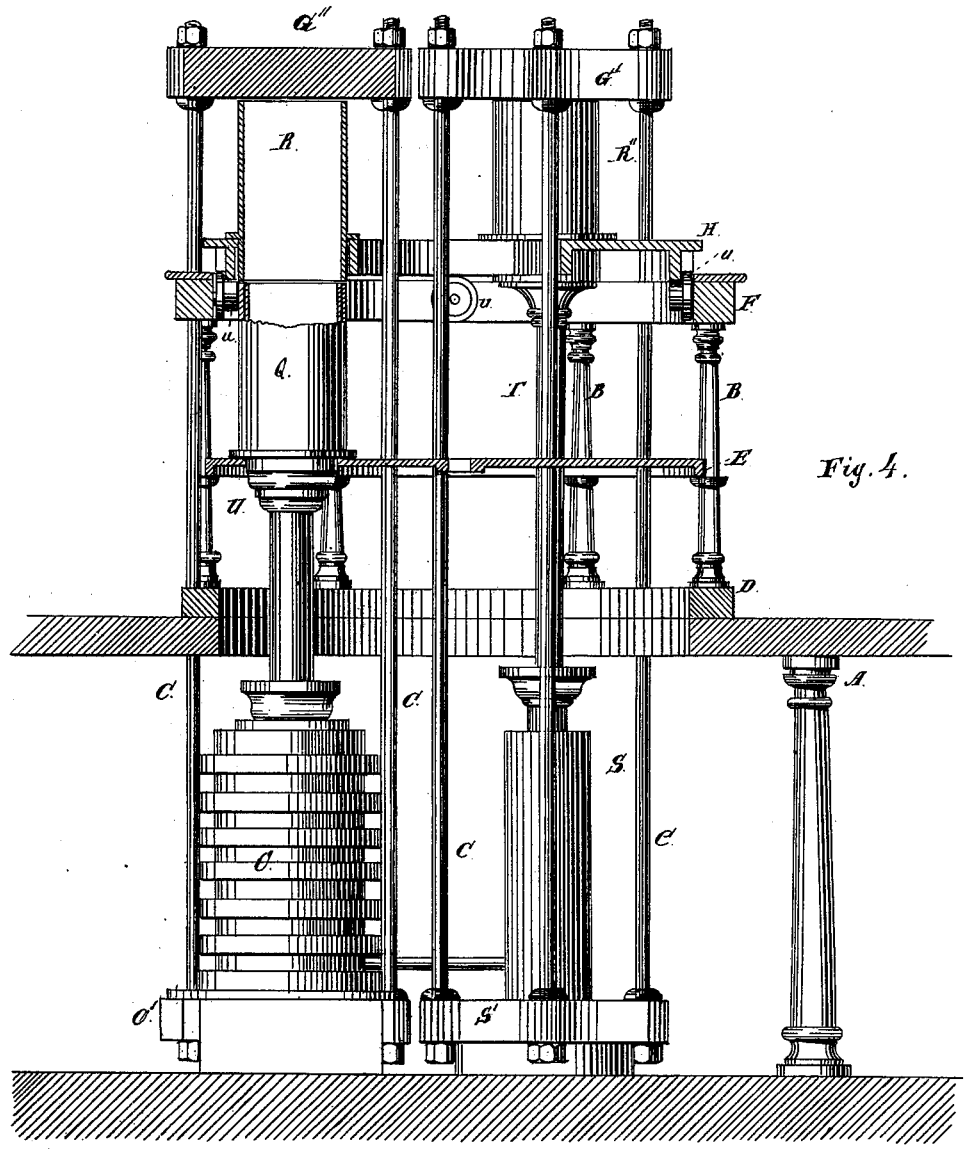
Figure 5:
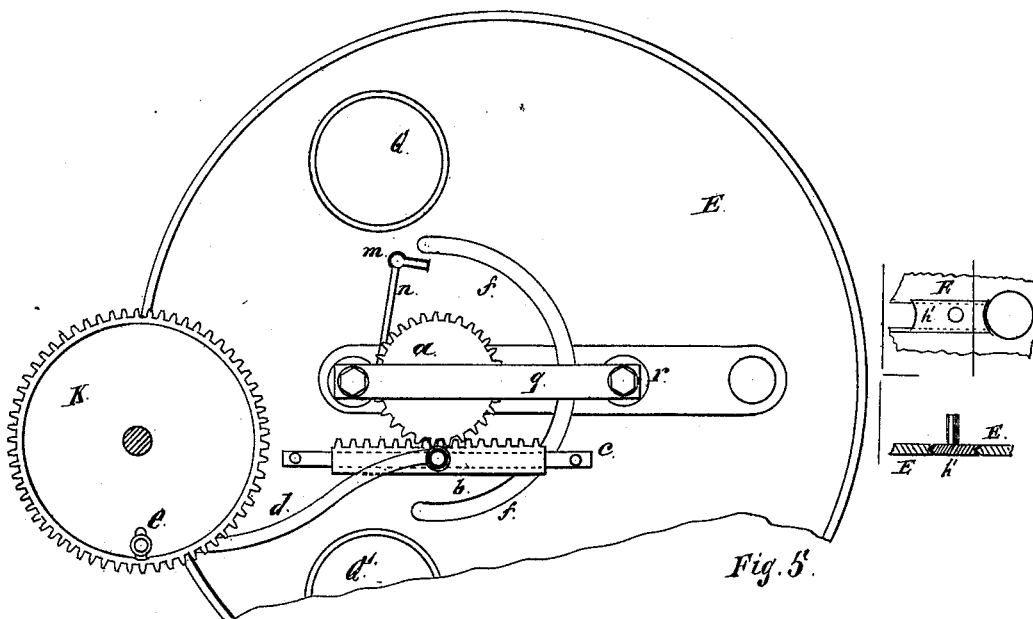
Figure 9:
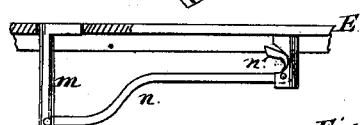
Figure 8:
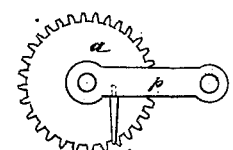
Figure 6:
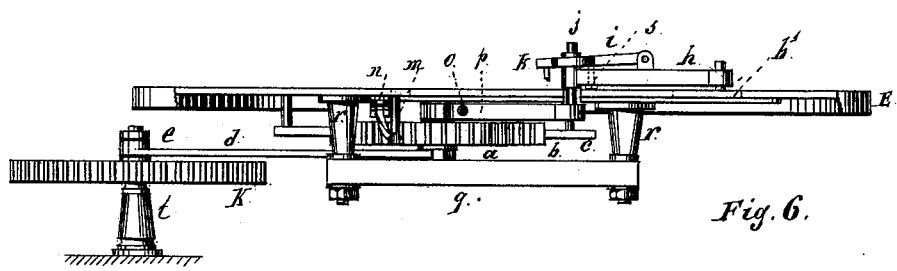
Figure 7:
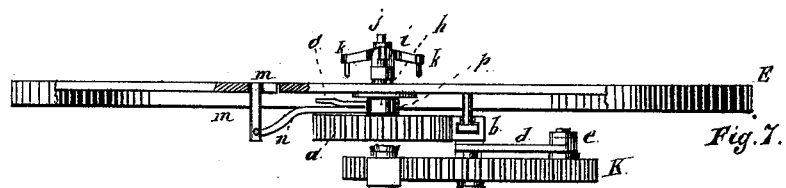

Figure 1 is a side elevation; Fig. 2, a top view; Fig. 3, a horizontal section on line $x\ x$ of Fig. 1; Fig. 4, a vertical section on line $y\ y$ of Fig. 2; Fig. 5, a bottom of the platform E and its attachments; Figs. 6 and 7, a cross-section of the same plate; Figs. 8 and 9, enlarged details.

The object of this invention is to provide a machine for pressing dry-ground tan-bark or other materials into cakes sufficiently solid for transportation without incasing them for shipment, and, by a series of compressions, so reduce the bark in bulk as to greatly facilitate its transportation, and to so combine and arrange the parts that the series of compressions can be easily and rapidly made, and a powerful compression given at the last operation of the press; and its nature consists in providing the press with a series of containing-cylinders adapted to be shifted from one part of the press to another; in arranging such cylinders to be successively operated upon by presses of increasing powers; and in the several parts and combination of parts hereinafter described and claimed as new.

In the drawings, A represents the base-frame; B, the secondary frame; C, the tie-rods connecting the upper and lower plates together; D, the circular plate forming the base of the frame B; E, the platform dividing the frame B into two sections; F, the circular plate forming the top of the frame B; G G' G'', the top plates; H, the revolving platform, provided with cogs on its periphery; I, the pinion for revolving the platform H; J, the bevel-wheel; K, the gear-wheel for operating the devices for shifting the cylinders; L, the pinion for driving the wheel K; M, the main or power shaft, provided with a pinion for driving the wheel J; N, a steam-press; O, a hydraulic press; P, the lower section of the cylinder located above the steam-press; Q Q', the cylinders located between the platforms E and H; R R' R'', the upper sections of the cylinders; S, a small hydraulic press or piston for discharging the compressed material; T, the piston shaft or rod; U, the piston shaft or rod of the press O; $a$, the gear-wheel; $b$, the sliding rack for operating the wheel $a$; $c$, the bar upon which the rack $b$ slides; $d$, the pitman or arm for moving the rack $b$; $e$, the pin connecting the pitman $d$ with the wheel K; $f$, the circular groove in the platform E; $g$, the radial groove; $h$, the pivoted sliding arm; $h'$, block sliding back and forth in the radial groove; $i$, the hook for engaging with and removing cylinders Q' Q'; $j$, the pin at the inner end of the arm $h$, for holding the hook in position; $k$, the pins at the inner end of the hook $i$; $l$, the holes or openings in the lower rims of the cylinders Q Q'; $m$, the key or slide for lifting or disengaging the hook $i$; $n$, the lever for operating the pin $m$; $n'$, curve or cam on the inner end of lever $n$; $o$, the pin operating against the cam $n'$; $p$, the arm attached to the wheel $a$; $q$, the cross-bar, attached by studs $r$ to the under side of the platform E, for supporting the central gearing; $s$, the set-screw for adjusting the hook $i$; $t$, the journal-post for the wheel K; $u$, the wheels supporting the platform H; $v$, the slide on the under side of the top plate G.

The frame A may be made of wood. The rest of the frame-work is, by preference, made of metal. The stay or tie rods C pass through all of the frames, and connect the base-plates O' N' and S' with the top plates G G' G'', and thereby relieve the other parts of the machine from strain.

The top plate G'' is made solid, while G and G' are provided with circular openings of the same diameters as the cylinders below. G is also provided on its under face with a slide, $v$, for covering such central opening. In use the plate G' may be provided with a hopper, to facilitate filling.

The cylinders R R' R'' are permanently attached to the revolving platform H, and pass successively under each of the top plates when the machine is in operation. These cylinders and the cylinders Q Q' are made of equal ength and diameter, and in both of these dimensions they are made to produce the size of cake or bale desired. The compressed cakes are designed to weigh anywhere from five hundred to a thousand pounds, three of such cylinders being of a sufficient capacity to hold the desired amount or weight.

The cylinders Q Q' are attached, so that they may be passed from one position to another.

Collars on the under side of the platform H are to be provided, fitting the cylinders when in position, so as to carry them around to their proper place when filled with bark.

The cylinder P is permanently located above and in line with the steam-press N.

When the cylinders Q Q' are empty they are passed around to the position of Q' by means of the hook $i$ and the devices for operating it. The hook $i$ is attached to the bar or lever $h$, which is pivoted, at its outer end, to the slide $h'$, passing back and forth in the radial groove $g$, and its inner end is provided with a pin, $j$, which projects upward, and is provided with an anti-friction collar, operating between the prongs of the hook $i$, which pin $j$ projects through the groove, and connects, below the plate E, with the arm $p$, which is permanently attached to the gear-wheel $a$. The hook $i$ is pivoted to this arm or lever $h$ near the middle, as shown in Fig. 6. The arm $p$ is provided with a projecting pin, $o$, which, when the arm is at its extreme movement, strikes against the projection $n'$ of the lever $n$ and raises the pin $m$, thereby lifting the hook $i$, so that the pin or pins $k$ will pass over the rim of the cylinders Q Q' to the holes $l$. When the reverse movement takes place the pins $k$ drop into the holes $l$ and engage with the cylinder, which then moves with the hook $i$ from Q around to position at Q', ready for the next operation.

The wheel $a$, to which the arm $p$ is attached, is operated in a reverse direction by the sliding rack $b$, which rack moves back and forth as the wheel K is revolved, giving the wheel $a$ a sufficient movement to carry the hook $i$ from one end to the other of the circular groove $f$.

For the purpose of adjusting the movement of the pin $j$ in the circular groove $f$, so as to give it more or less throw, the wrist-pin $e$ is placed in a radial slot in the wheel K, (shown at Fig. 5,) so that the pin $e$ may be moved toward or from the center, thereby regulating the movement of the rack $b$; and in order to adjust the throw of the pin $j$ and the parts carried by it at an equal distance from the center in the groove $f$, the wheel K is adjusted to the right or left by means of its pivot-post $t$, which is set in the slot in the rim D for that purpose.

The parts are all adjusted to move in equal time, and the pinions I and L are arranged, in connection with their respective main wheels or platforms, to bring all of the parts into exact position at the proper time.

The pumps or chambers N, O, and S are of the ordinary construction, and are made sufficiently strong to accomplish the purpose for which they are designed. They are provided with pistons fitted to the pumps or chambers at their lower ends, and at their upper ends are provided with heads or plates fitting the containing-cylinders. The piston of the steam-pump N is short, and is designed to operate only through the cylinder P, and sufficiently far into Q to free it from the platform E. The piston U of the hydraulic press O is longer, and enters the cylinder Q located above the platform E, and presses the material through the cylinder Q sufficiently far into the cylinder R to clear the cylinder Q from the revolving platform H, and gives the cake or bale its final pressure. The hydraulic press S is provided with a piston-rod reaching from the press to the revolving platform H, and its office is to discharge the cake or bale from the upper cylinder.

In operation, two of the cylinders are placed over and in line with the lower cylinder, as shown at P, Q', and R' in Fig. 1. In this position the three are filled from the top with the ground bark or other material. The slide $v$ is then pushed in, and covers the opening through the top plate. Steam-pressure is then applied through the steam-press N, pressing the material upward, and compressing it sufficiently to clear the cylinder P, which said cylinder always remains stationary and in position. Movement is then given to the platform, carrying the cylinders Q' and R' to the position of Q and R, as shown in Fig. 1. A small space is left between the bottom of the cylinder R' and the top of cylinder Q', and as the bark is forced into Q' by the action of the press it carries the cylinder up against the upper cylinder R', where it is held by the tenacity of the bark compressed into the two cylinders. Spring-catches or pressure-springs may be added to grasp the top of the cylinder Q', if the bark does not hold it up. The interposed revolving plate thus carries both sets of cylinders. A powerful pressure is then given to the material by the hydraulic press O, which presses the cake to the desired solidity. This pressure, in compressing tan-bark, is made exceedingly powerful; and I use, in connection with the hydraulic press, a pump arranged to cease operation when the desired pressure is attained, in order to prevent breaking the machine. Owing to the powerful pressure which is used in tan-bark, it is found difficult to discharge the cake, and for this purpose the platform H again moves the upper cylinder containing the cake to the position shown at G' in Fig. 2, in which position the smaller hydraulic press S is put in operation and discharges the cake through the plate G' out at the top.

When the press O is in operation the movement of the machine is such that three cylinders are again brought in line over the steam-press and filled, and the steam-pressure applied. The steam-press being so much quicker in its operation than the hydraulic press, this filling and initial pressure can be given while the hydraulics are operating. The next movement of the revolving platform H carries the cylinders connected with it around in line with the hydraulic press O; and the same movement which carries these cylinders carries the upper one around to the discharge-press, and by means of the hook $i$ returns the empty cylinder Q to its position over the steam-press, so that after the second pressure is given to the first cake or bale the operations of filling and initial pressure, final pressure, and discharge are carried on at the same time, thereby forming a press which, while necessarily slow in its separate operations, is in its complete action a rapid press, enabling me to form cakes or bales rapidly, and at the same time utilize the slow operations necessary to give the powerful pressure required.

I have described the press for compressing ground tan-bark, as it is designed for this purpose; but it is evident that it may be used for compressing various other materials.

It is also evident that it may be operated by hand from the crank shown in the shaft M; or the power may be applied at that point by the usual means if a rapid movement is desired; also, that the hook $i$ may be changed in form. One form in which I propose to use it is to apply a cross-bar at the end, and, instead of being lifted into position by separate devices, it may be made inclined, so as to slip into position.

What I claim as new, and desire to secure by Letters Patent, is—

1. The combination of the fixed cylinder or section P with the movable cylinders or sections Q′ and R′, for forming a receiving and compression cylinder, substantially as set forth.

2. The combination of the movable sections or cylinders Q and R with the press O, substantially as and for the purpose described.

3. The combination of the section or cylinder R″ with the press S and open top plate G′, for discharging the cake or bale, substantially as specified.

4. The combination of the sections or cylinders R, R′, and R″ with the fixed top plates G, G′, and G″ and revolving platform H, for bringing them successively into operation, substantially as described.

5. The combination of the cylinders R, R′, and R″ and revolving platform H with the cylinders Q and Q′, substantially as described.

6. The combination of the cylinder P with the cylinders Q Q′, operating in a higher plane, and with the cylinders R, R′, and R″, operating in a still higher plane, so that they may be interchangeably used, substantially as set forth.

7. The combination of the cylinders R, R′, R″, Q, Q′, and P and presses N O S with the revolving platform H and fixed platform E, all constructed and operating substantially as specified.

8. The combination of the wheel K, having the pin $e$, and pitman $d$ with the sliding rack $b$, wheel $a$, and arm $p$, for driving the pin $j$ back and forth in the circular groove $f$, substantially as specified.

9. The combination of the lever or arm $h$, hook $i$, pin $j$, and plate $h'$ with the radial groove $g$ and the semicircular groove $f$, for shifting sides with the hook, substantially as set forth.

10. The combination of the wheel K, pitman $d$, sliding rack $b$, pinion $a$, arm $p$, and pin $j$ with the arm or lever $h$, sliding block $h'$, and hook $i$, substantially as specified.

11. The combination of the pin $m$ and lever $n$, having the cam or projection $n'$, with the pin $o$ and arm $p$, for lifting the grappling-hook $i$ at its extreme movement, substantially as described.

12. The combination of the pinions I and L with the cogged platform H and wheel K, for moving and shifting the cylinders or sections to position, substantially as set forth.

CORNELIUS KIMPLEN.

Witnesses:
O. W. BOND,
H. F. BRUNS.